(12) United States Patent
Seiden et al.

(10) Patent No.: US 7,352,512 B2
(45) Date of Patent: Apr. 1, 2008

(54) COMPACT SELF-COMPENSATING BEAM SPLITTER APPARATUS AND METHOD OF USING

(75) Inventors: Harold N. Seiden, Newbury Park, CA (US); Lynne C. Eigler, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 11/178,874

(22) Filed: Jul. 11, 2005

(65) Prior Publication Data

US 2007/0008623 A1    Jan. 11, 2007

(51) Int. Cl.
*G02B 27/14* (2006.01)
(52) U.S. Cl. .................. 359/629; 359/833; 359/834
(58) Field of Classification Search ............. 359/629, 359/495, 497, 638, 833, 834
See application file for complete search history.

(56) References Cited

U.S. PATENT DOCUMENTS

| | | | |
|---|---|---|---|
| 2,749,793 A | | 6/1956 | White |
| 3,720,457 A | * | 3/1973 | Swartz et al. ............. 359/495 |
| 3,806,257 A | * | 4/1974 | Amos ....................... 356/432 |
| 5,752,107 A | | 5/1998 | Hasushita et al. |
| 5,825,555 A | * | 10/1998 | Oono et al. ............... 359/668 |
| 5,923,470 A | * | 7/1999 | Pan et al. ................. 359/495 |
| 6,009,564 A | | 1/2000 | Tackles et al. |
| 6,611,383 B1 | | 8/2003 | Lee |
| 2001/0053033 A1 | * | 12/2001 | Bolt ......................... 359/831 |
| 2003/0086452 A1 | * | 5/2003 | Short ........................ 372/32 |

OTHER PUBLICATIONS

M. Shigehara et al., "Variable Attenuation and Wavelength Filter", Sumitomo Electric Industries, Ltd.
J. Harlander et al., "Shimmer: A spatial Heterodyne Spectrometer for Remote Sensing of Earth's Middle Atmosphere", Mar. 1, 2002, vol. 41, No. 7, Applied Optics.
J. Harlander et al., "Robust Monolithic Ultraviolet Interferometer for the Shimmer Instrument on STPSat-1", May 20, 2003, vol. 42, No. 15, Applied Optics.
Thor Labs, "Polarizing Beamsplitter Cubes", 2005 THOR Lab's vol. 17 Catalog, p. 653.
Oriel Instruments Beam Splitters Technical Discussion; pp. 13-9, 13-10, and 12-4.
Los Alamos National Laboratory, "Full Aperature Backscatter Station with Imaging," Feb. 8, 2000.
Francisco Diego, "Confocal Imager Slicer", Applied Optics, vol. 32, No. 31, Nov. 1993, pp. 6284-6287.

* cited by examiner

*Primary Examiner*—Hung Dang
*Assistant Examiner*—Vipin M Patel
(74) *Attorney, Agent, or Firm*—MacPherson Kwok Chen & Heid LLP; Greg J. Michelson

(57) ABSTRACT

In accordance with an embodiment of the present invention, an optical system includes two tilted planar elements each having two surfaces for which the sign of the slopes of at least three of the four surfaces that an incident beam encounters are the same and which, when inserted into the path of the incident beam produces an output beam having no angular deviation and essentially no lateral deviation from the incident beam path.

32 Claims, 12 Drawing Sheets

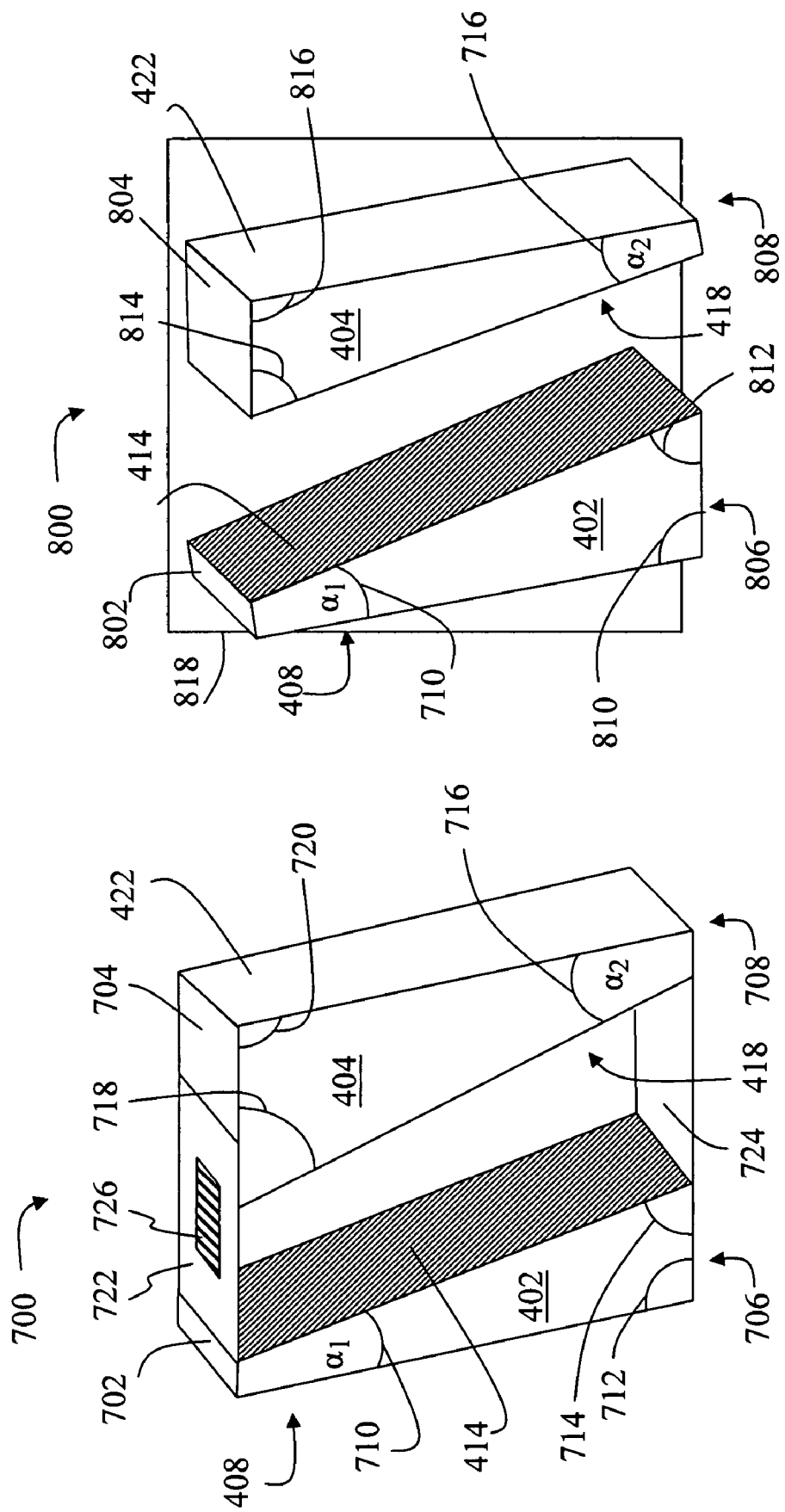

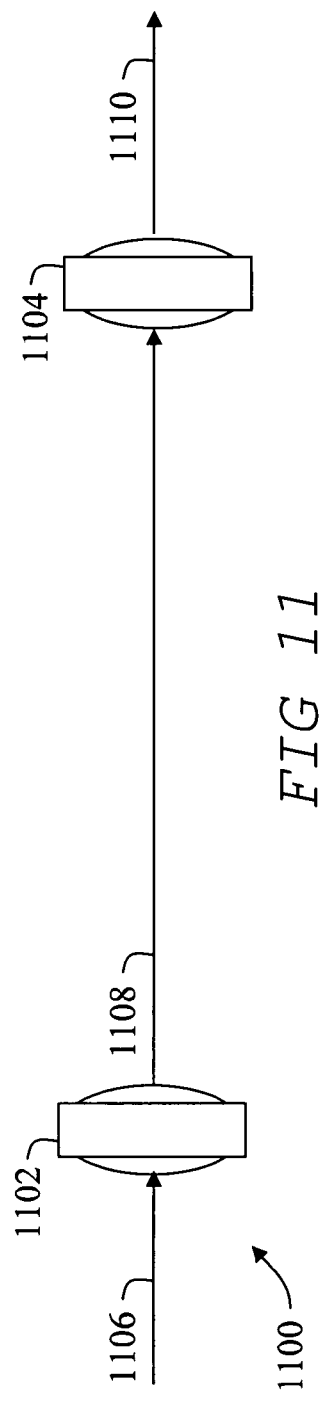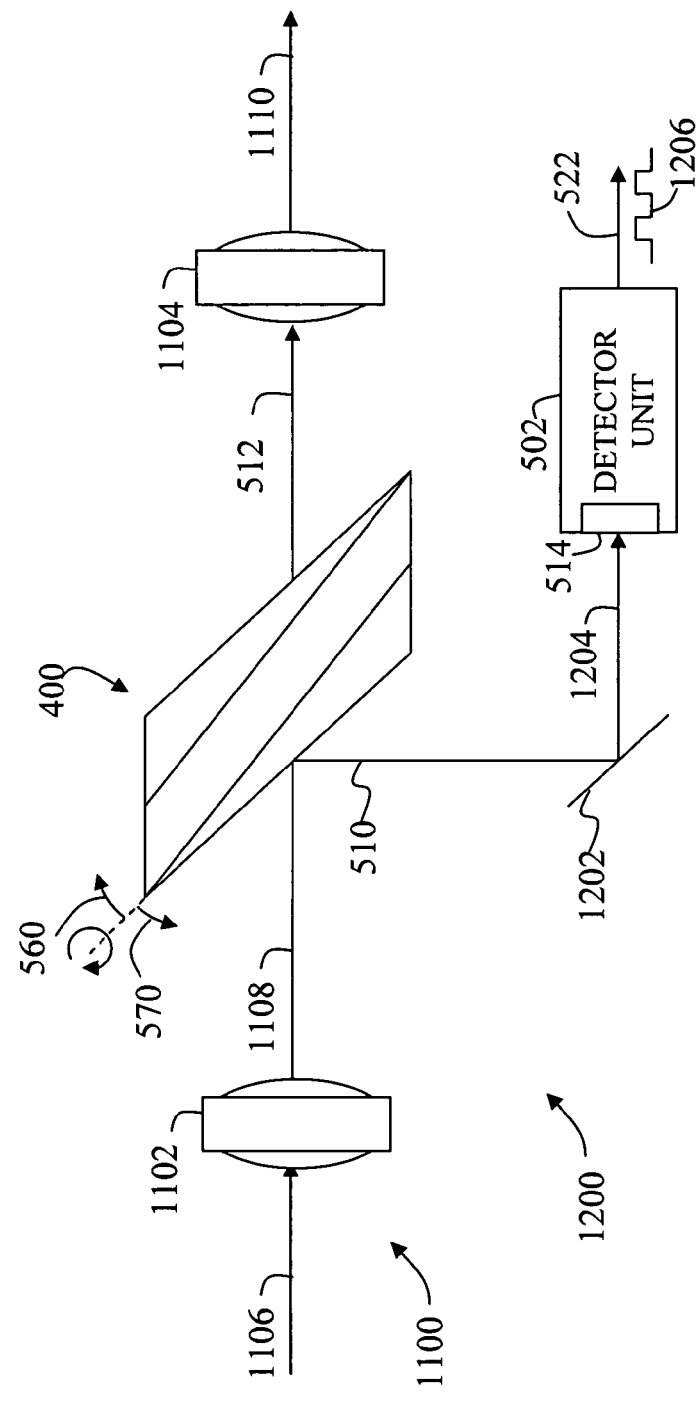

COMPACT SELF-COMPENSATING BEAM SPLITTER APPARATUS AND METHOD OF USING

STATEMENT REGARDING FEDERALLY SPONSORED RESEARCH OR DEVELOPMENT

This invention was made with United States Government support under USZA22-02-C-0049 awarded by the U.S. Special Operations Command. The United States Government has certain rights in this invention.

TECHNICAL FIELD

The present invention relates generally to optical systems and, more particularly, to a compact beam splitter having an output light beam with minimal lateral and angular deviation from the path of the input light beam.

BACKGROUND

Devices and methods for sampling a beam in an optical path are available in a variety of configurations. Typically, optical devices such as beam splitters are used for beam sampling. Two common types of beam splitters include a plate beam splitter (as shown in FIG. 1) and a cube beam splitter (as shown in FIG. 2), both of which produce effects that may be undesirable for a particular optical configuration.

A cube beam splitter does not normally cause a deviation in the optical path of a beam passing through it in either angle or displacement, provided that the cube beam splitter is used at normal incidence. However, a cube beam splitter tends to be a heavy component and introduces aberrations into the beam. A plate beam splitter laterally displaces the optical path of a beam, but has the advantage of introducing minimal aberrations. Two plate beam splitters can be used together in a tented configuration (as shown in FIG. 3) to correct displacement of the transmitted ray path. However, this type of assembly is relatively large and heavy.

There remains a need for a compact, lightweight beam splitting apparatus that minimizes aberration and beam deviation in both displacement and angle.

SUMMARY

A system and method for using a self-compensating, compact and minimally deviating beam splitter is provided. More specifically, in accordance with one embodiment of the present invention, an optical system includes two tilted planar elements each having two surfaces for which the sign of the slopes of at least three of the four surfaces that an incident beam encounters are the same and which, when inserted into the path of the incident beam produces an output beam having no angular deviation and essentially no lateral deviation from the incident beam path.

In accordance with another embodiment of the present invention, a method of inserting the above system into an optical train that does not cause a deviation of the incident line of sight.

The scope of the invention is defined by the claims, which are incorporated into this disclosure by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7 shows a perspective view of a beam splitter including a rigid frame in accordance with an embodiment of the present invention.

FIG. 8 shows a perspective view of a beam splitter with optical elements mounted on a planar member in accordance with an embodiment of the present invention.

FIG. 11 shows a portion of an optical system.

FIG. 12 shows a portion of an optical system including a self-compensating, sampling beam splitter and a detector unit in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
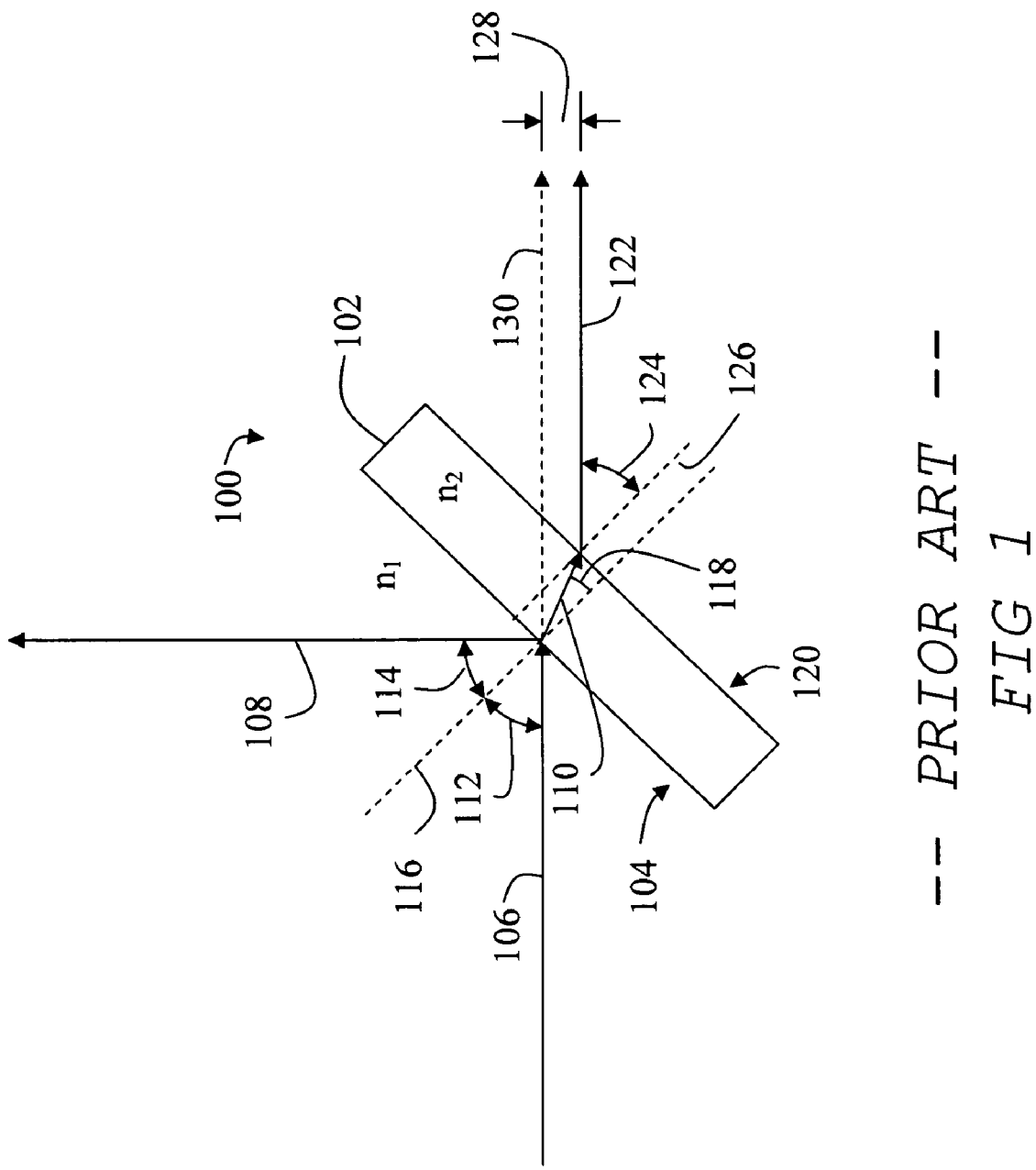
FIG. 1 shows a side view of a conventional plate beam splitter.

A conventional plate beam splitter 100, as shown in FIG. 1, can be an optical window or plate 102 with a first surface 104 having a semi-transparent mirrored (partially reflecting) coating used to split an incident ray 106 into a reflected ray 108 and a refracted ray 110. Incident ray 106 strikes the first surface 104 at a non-normal angle of incidence 112, $\theta_{112}$, and is reflected at an angle of reflectance 114, $\theta_{114}$. Angle of incidence 112 and angle of reflectance 114 are equal about a surface normal, 116, at the point where incident beam 106 strikes first surface 104.

If the index of refraction, $n_2$, within the plate 102 is different from the surrounding environment, $n_1$, refracted ray 110 makes a different angle, an angle of refraction 118, $\theta_{118}$, with normal line 116. The relationships between the angles is described by the well known Snell's law as $$n_1\sin(\theta_{112}) = n_2\sin(\theta_{118})$$ Equation-1

Refracted ray 110 emerges from a second surface 120 of the plate 102 as a transmitted ray 122. For a plane parallel plate, transmitted ray 122 leaves second surface 120 at an angle 124 that is equal to angle of incidence 112 when measured against surface normal 126 at the point where transmitted ray 122 leaves second surface 120. The transmitted ray 122 is now parallel to incident ray 106.

Due to a difference between the indices of refraction within plate 102 and the surrounding environment, and the fact that incident ray 106 did not strike first surface 104 at a normal angle, there will be a lateral displacement 128 between a continuation 130 of incident ray 106, defining the optical path of incident ray 106, and transmitted ray 122. Use of Snell's law and some geometry shows that the lateral displacement 128 (or D) due to a plane parallel plate is given by $$D = t\sin(\theta_{112}[1-sqrt(1-\sin^2(\theta_{112})/n_2^2 - \sin^2(\theta_{112}))]) \quad \text{Equation-2}$$

where t is the thickness of the plane parallel plate measured normal to the first surface.

In this disclosure, the term lateral displacement includes any offset in distance that is not coincident with the input beam propagation direction and can include vertical displacement as well as horizontal displacement. In a traditional optical system, interposing a plate beam splitter 100 to sample an optical signal will introduce a lateral displacement 128. In this manner, a plate beam splitter 100 laterally deviates the optical path of a beam, but has the advantage of introducing minimal aberrations. A single element wedged beam splitter is sometimes used to even further minimize the aberrations of the transmitted beam or to prevent overlap of internally reflected beams. However, a single element wedged beam splitter not only causes displacement beam deviations similar to that of a flat plane parallel beam splitter but it also introduces angular deviation into the transmitted beam, 122.

Figure 2:
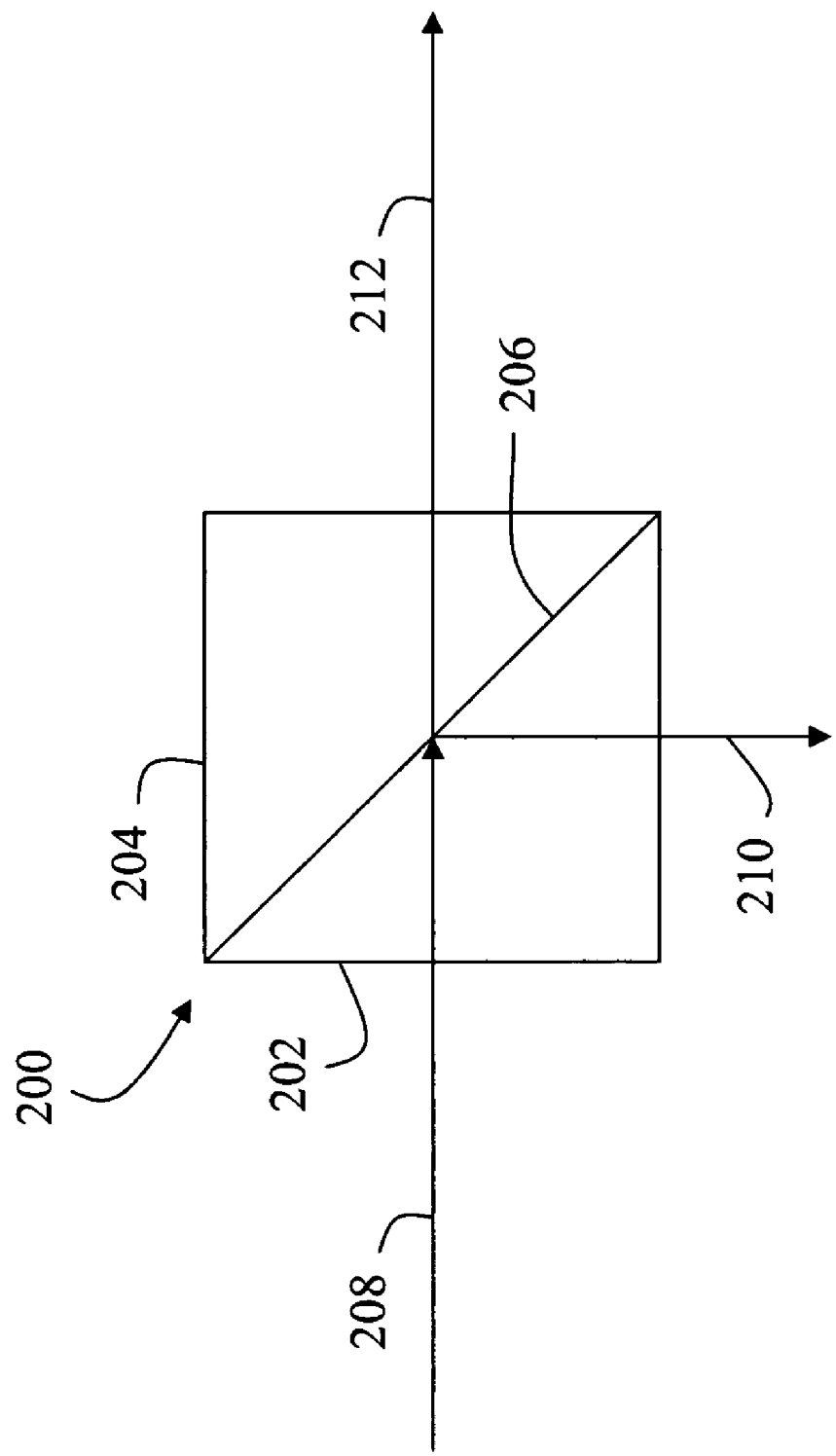
FIG. 2 shows a side view of a conventional cube beam splitter.

FIG. 2 shows a conventional cube beam splitter 200 constructed using two right-angle prisms together (202, 204) where the hypotenuse of each right-angle prism are facing each other along a diagonal 206. The cube beam splitter 200 receives an incident beam 208 at a normal angle along an optical path and reflects a portion of the incident beam 208 energy at internal surface 206 as a reflected beam 210. The remaining portion of incident beam 208 energy will travel through first right-angle prism 202 and the second right-angle prism 204 to emerge as a transmitted beam 212. The disadvantages of a cube beam splitter are that it tends to be a heavy component and it introduces aberrations into the beam. If the user desires to gain information about a beam of light, having to pass the beam through additional glass adds to the error in the resultant measurement.

Figure 3:
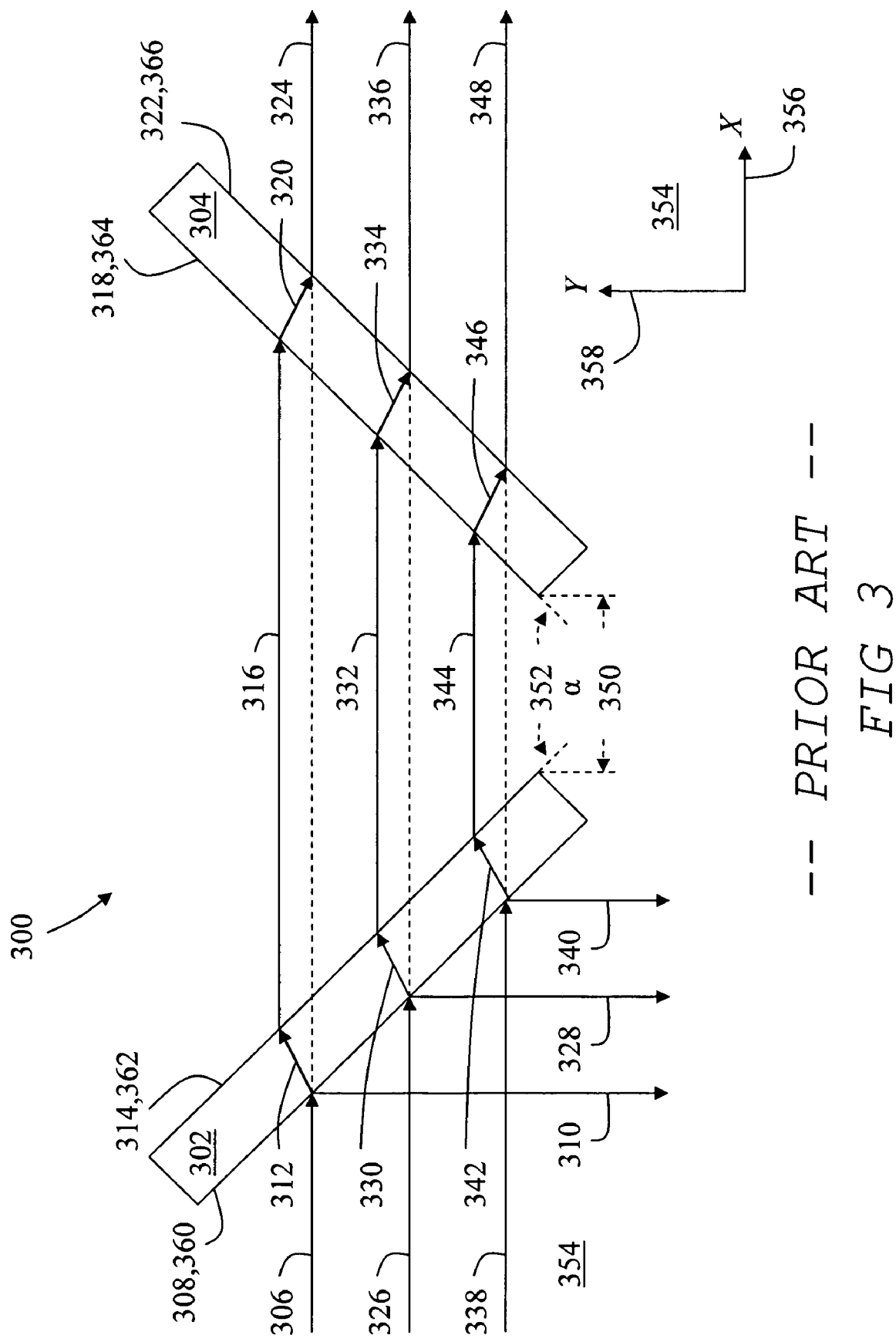
FIG. 3 shows a side view of a conventional dual plate beam splitter in a tented configuration.

FIG. 3 shows a conventional beam splitter 300 in a tented, or inverted tent, configuration including a first optical window or plate 302 and a second optical window or plate 304. An incident light beam 306 on an optical path strikes a first surface 308 of first plate 302 to produce a first reflected beam 310 and a first refracted beam 312. First refracted beam 312 follows a trajectory, described by Snell's law, within first plate 302 based on the indices of refraction within first plate 302 and the incident medium, and emerges from a second surface 314 of first plate 302 as a first transmitted beam 316. First transmitted beam 316 strikes a first surface 318 of second plate 304 to produce a second reflected beam (not shown) and a second refracted beam 320. Second refracted beam 320 emerges from a second surface 322 of the second plate 304 as a second transmitted beam 324. Based on the orientation of first plate 302 and second plate 304, beam splitter 300 can be made to be minimally deviating so that incident light beam 306 is coincident with second transmitted beam 324 while first reflected beam 310 may be sampled by a detector or other sensory apparatus, including a human observer.

Beams parallel to input beam 306, such as incident beams 326 and 338 which strike different portions of first plate 302, will emerge as beams 336 and 348 which are parallel to the emerging beam 324. That is, when the plates are plane parallel and oriented properly, if one beam emerges non-deviated then all beams parallel to the input beam will emerge non-deviated.

Referring to FIG. 3 and to Equation-2, it can be seen that the output segment of beam 306 will only be undeviated if the lateral translation due to the first plate is exactly offset by the translation due to the second plate. Referring to Equation-3a, the total deviation must equal the sum of the deviations due to each plate and must also be equal to zero or $$D_{total} = D_1 + D_2 = 0 \quad \text{Equation-3a}$$

where the subscripts refer to the two plates. This requires that $$D_1 = -D_2 \quad \text{Equation-3b}$$

Since the only way that the deviation can have a negative value is for the sign of the angle of incidence on the plate to be negative. Since n and t cannot be negative it follows that the angle of incidence relative to a surface normal of the first plate must be opposite to the angle of incidence relative to a surface normal of the second plate.

The local coordinate system is defined as having its positive x-axis parallel to and pointing in the direction of incident light ray 326. Per the definition of a right handed coordinate system, the y-axis is defined as being perpendicular to the x-axis and residing in the plane of incidence. Lines 356 and 358, respectively, illustrate these axes in FIG. 3. The slope of a line in the xy-plane is defined as (y2−y1)/(x2−x1), where (x2,y2) and (x1,y1) are two points on the line. A line having a positive slope will lean to the right in this coordinate system, while one having a negative slope will lean to the left.

The incidence angles at first surface 308 and second surface 314 are opposite in sign from the signs to third surface 318 and fourth surface 322. Per the above definition, the slopes of these surfaces relative to their respective incident rays are also opposite in sign. If the plates are of the same material and are the same thickness, then the plate angles are equal and opposite. Note that if the angle α is 90 degrees as is the usual case, if distance 350 is equal to zero, and if the plates are made to exactly match the beam size, then the minimum length of the assembly is given by 2 times the beam diameter plus the thickness of the two plates divided by the cosine of the tilt angle; i.e., the minimum length for two identical plates is $$\text{Length}_{minimum} = 2[\text{beam diameter} + t]/\cos(\theta) \quad \text{Equation-4}$$

Figure 4:
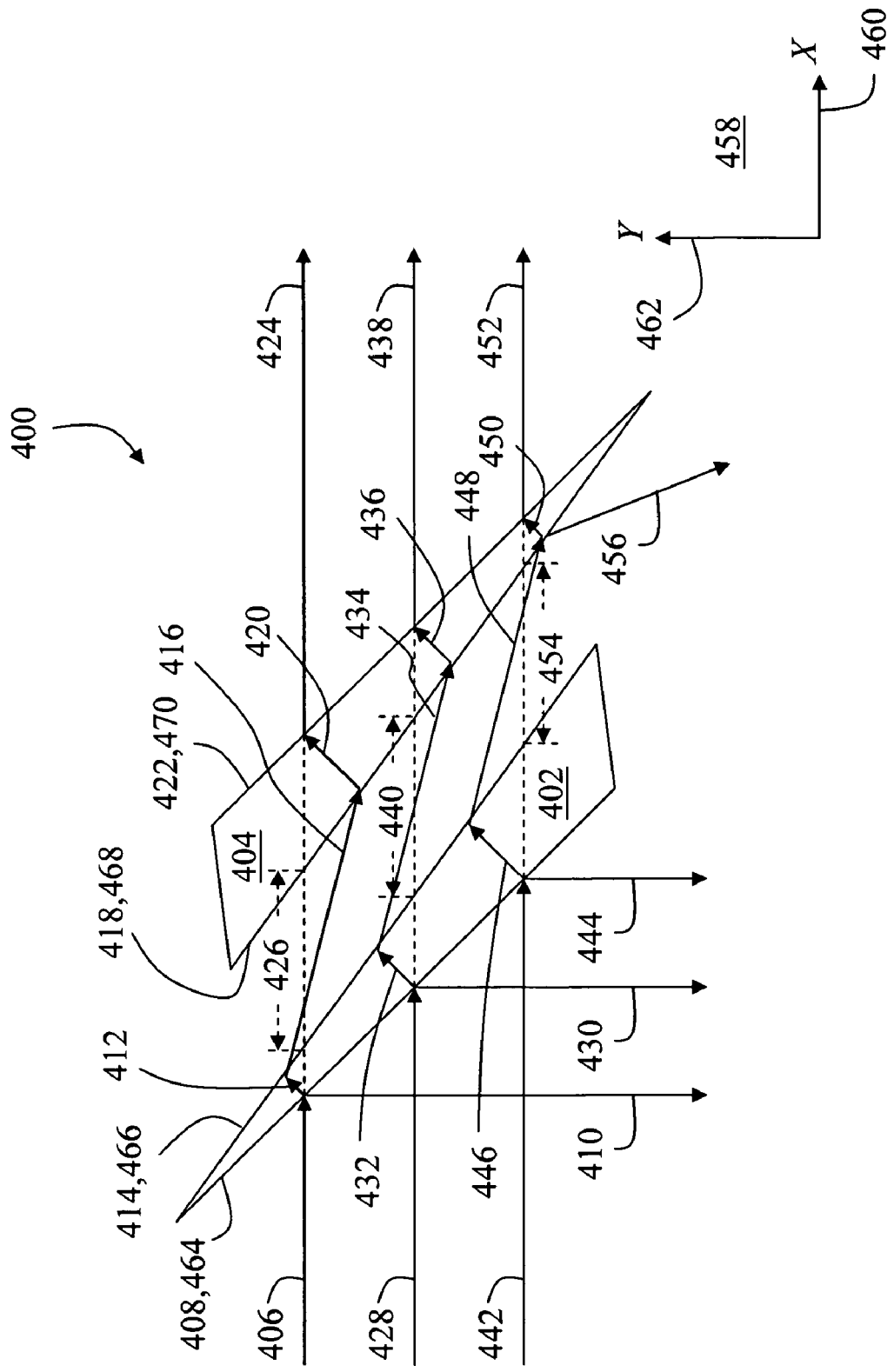
FIG. 4 shows a side view of a beam splitter in accordance with an embodiment of the present invention.

FIG. 4 shows a side view of a compact beam splitter 400 in accordance with an embodiment of the present invention. The beam splitter 400 includes a first optical element (also referred to as a tilted planar element) such as a prism 402 and a second optical element such as a prism 404. An incident light beam 406 on an optical path strikes a first portion of a receiving surface such as a first surface 408 of first prism 402 to produce a first reflected beam 410 and a first refracted beam 412. The incident beam 406 and the reflected beam 410 lie within and define the incident plane. First refracted beam 412 follows a trajectory within first prism 402 and emerges from a second face 414 of first prism 402 as a first transmitted beam 416.

First transmitted beam 416 strikes a first surface 418 of second prism 404 to produce a second reflected beam (not shown) and a second refracted beam 420. Second refracted beam 420 emerges from a transmitting surface such as second face 422 of second prism 404 as a second transmitted beam 424 or output beam. In this configuration, the path length of first refracted beam 412 is shorter than second refracted beam 420 since first prism 402 is narrower along the optical path of incident beam 406 than is second prism 404. Surface 418 can include an anti-reflection coating to maximize transmitted beam. 420 and to minimize the second reflected beam (not shown). Similarly, surfaces 408, 414 and 422 can include anti-reflection coatings. When one or more of the surfaces (408, 414, 418, 422) are coated with a partially absorbing material, the resulting apparatus may be used as an attenuator.

First face 408 and second face 414 of first prism 402 define planar surfaces that meet at an actual or projected apex to form a first apex angle. Similarly, first face 418 and second face 422 of second prism 404 define planar surfaces that meet at an actual or projected apex to form a second apex angle. Finally, first prism 402 and second prism 404 are separated by an intermediate distance 426 along the optical path of first incident beam 406 and oriented in proximity to each other so that second surface 414 of first prism 402 and first surface 418 of second prism 404 define planar surfaces that meet at an actual or projected apex to form a third apex angle. The third apex angle can be zero under certain conditions. For example, if the second surface 414 of first prism 402 and first surface 418 of second prism 404 are parallel, and the first surface 408 of the first prism and the second surface 422 of the second prism are parallel, then the third apex angle is zero. In the current preferred embodiment surface 408, 414, 418, and 422 are all perpendicular to the incident plane although this is not required.

Due to the structure and orientation of the prisms (402, 404), the second transmitted beam 424 emerges along the optical path of the incident beam 406 with no angular deviation and no lateral displacement (or deviation) for a single wavelength. The system will have minimal lateral deviation even when beam splitter 400 is rotated slightly within the incident plane from the ideal, zero-lateral-deviation position or when used for multiple wavelengths. Since there is an angle for which there is both zero angular and lateral deviation for a single wavelength and for which there is zero angular deviation and a very small lateral deviation for multiple wavelengths, beam splitter 400 may be inserted into an optical path and adjusted by tilting and rotating so as to sample incident light beam 406 without disturbing the alignment of the other optical components in an existing optical system. Similarly, beam splitter 400 may be removed from an optical path without changing the alignment of the optical system. If the beamsplitter 400 is mounted kinematically, then once the tilt angle is set for zero angular deviation, the assembly may be repeatedly inserted and removed from an optical path without disturbing the alignment of that path.

Analogous to the incident beam 406, any beam parallel to beam 406 will emerge from beam splitter 400 parallel to the input beam 406 and essentially collinear with its own input beam. For a single wavelength the output beams may be all made to be collinear to their respective input beams.

FIG. 4 illustrates that each incident beam (406, 428, 442) strikes a different portion of first face 408 at a non-normal angle to produce a different reflected beam (410, 430, 444) and emerges to produce a different transmitted beam (424, 438, 452) where each transmitted beam (424, 438, 452) is coincident with the optical path of the corresponding original incident beam (406, 428, 442). Thus beam splitter 400 may be considered self-compensating. Beam splitter 400 may be considered to be compact since its minimum length is significantly less than that of the tented configuration of FIG. 3.

Figure 9:
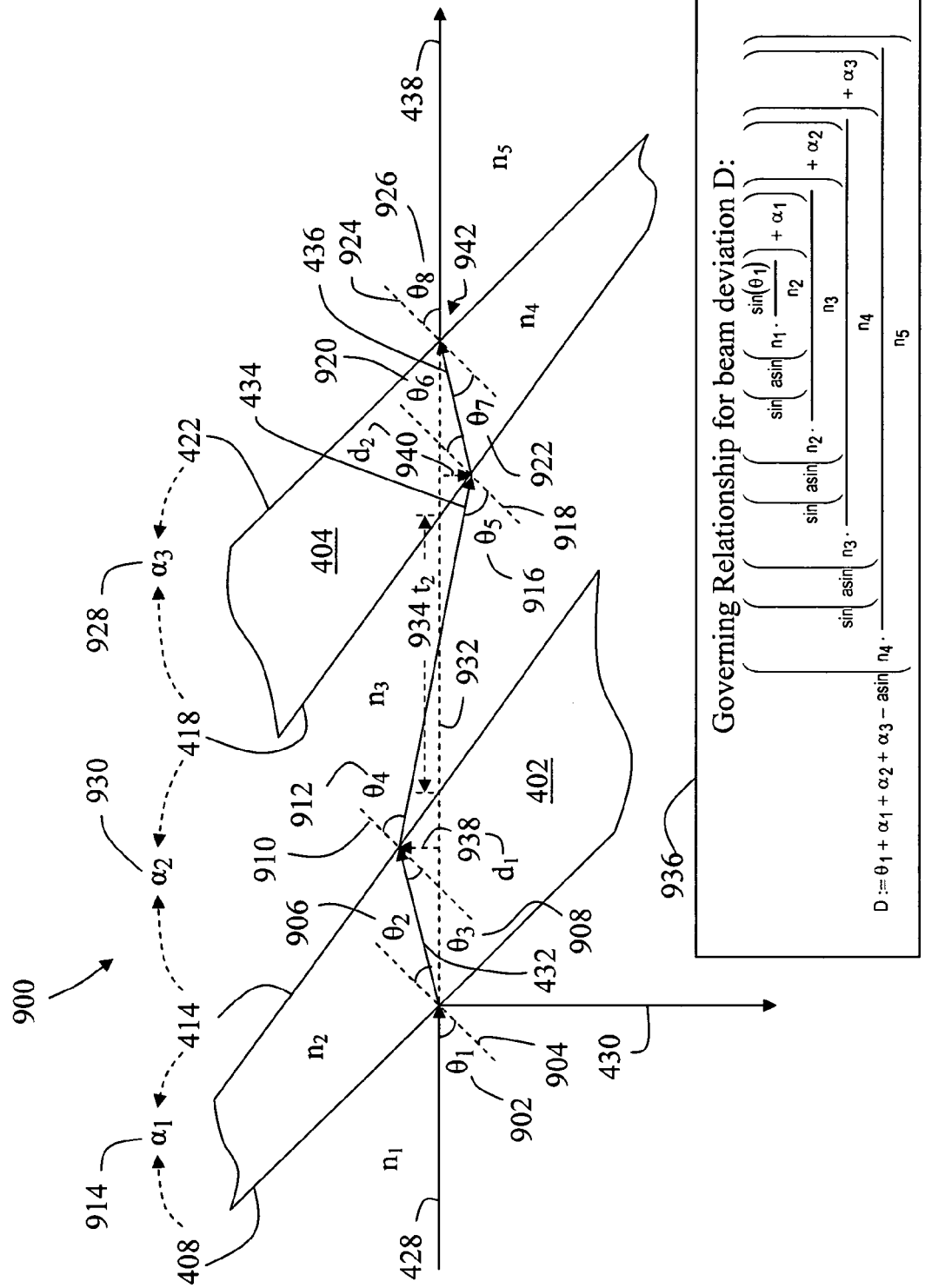
FIG. 9 shows a side view illustrating both internal and external angles relevant to the operation of a beam splitter in accordance with an embodiment of the present invention.

In an embodiment where the central angle $\alpha_2$ in FIG. 9 is zero, the two internal surfaces 414 and 418 are parallel to each other, the two external surfaces 408 and 422 are parallel to each other, and the two prisms are composed of the same material, the symmetry of the described apparatus causes the angular deviation to be zero for all wavelengths. The condition for not laterally deviating the beam can be met by properly choosing the separation of the two prisms. For this symmetric configuration, or indeed for any configuration, second prism 404 needs to be placed so that a lateral beam walk induced by first prism 402 is exactly compensated by second prism 404. It is only possible for the lateral displacement to be cancelled exactly for one wavelength at a time due to the dispersive effects of available prism materials. While the resulting lateral deviations at other wavelengths are not identically zero, they can be made small enough to have no practical impact on system alignment. Prisms (402, 404) may be constructed out of the same or different materials including fused silica, LaF21-Lanthanum Flint (refractive index n=1.717, Abbe number v=1.788), and FK54-Fluorocrown (refractive index n=1.437, Abbe number v=90.7). When either or both of prisms (402, 404) are constructed with a partially absorbing material, the resulting apparatus may be used as an attenuator. Stated differently, a fraction of the incident beam is absorbed while the remaining portion is propagated in a non-deviated manner. The configuration of FIG. 4 is shown to be more compact than the tented configuration shown in FIG. 3. Unlike many prism architectures, the symmetric construction of this embodiment allows the separation of rays 406, 428, and 442 to remain unchanged when reemerging as rays 424, 438, and 452 respectively.

In an alternative embodiment, the position and direction of each of the incident and reflected beams can be swapped so that incident light strikes beam splitter 400 from a position that is perpendicular to an optical path. For example, a reverse incident beam (not shown) can be applied in a reverse direction along the path of first reflected beam 410 and reflected from first surface 408 as a reverse reflected beam (not shown) in a reverse direction along the path of first incident beam 406. For example, the reverse reflected beam may be injected into the outcoupling aperture of a resonator in order to produce a forward reflected beam (not shown) that is boresighted to the optical axis of the resonator.

Consider x-axis 460 and y-axis 462 in FIG. 4. In the embodiment of the current invention described by FIG. 4, slopes of surfaces 408, 414, 418, and 422 are all of the same sign. This is in contrast to the prior art depicted in FIG. 3. This is also in contrast to another embodiment having no inter-prism medium, i.e., the two prisms are in contact with one another. In this embodiment, the slopes of all but one of the relevant prism surfaces have the same sign, the remaining surface having a slope of the opposite sign.

Figure 5:
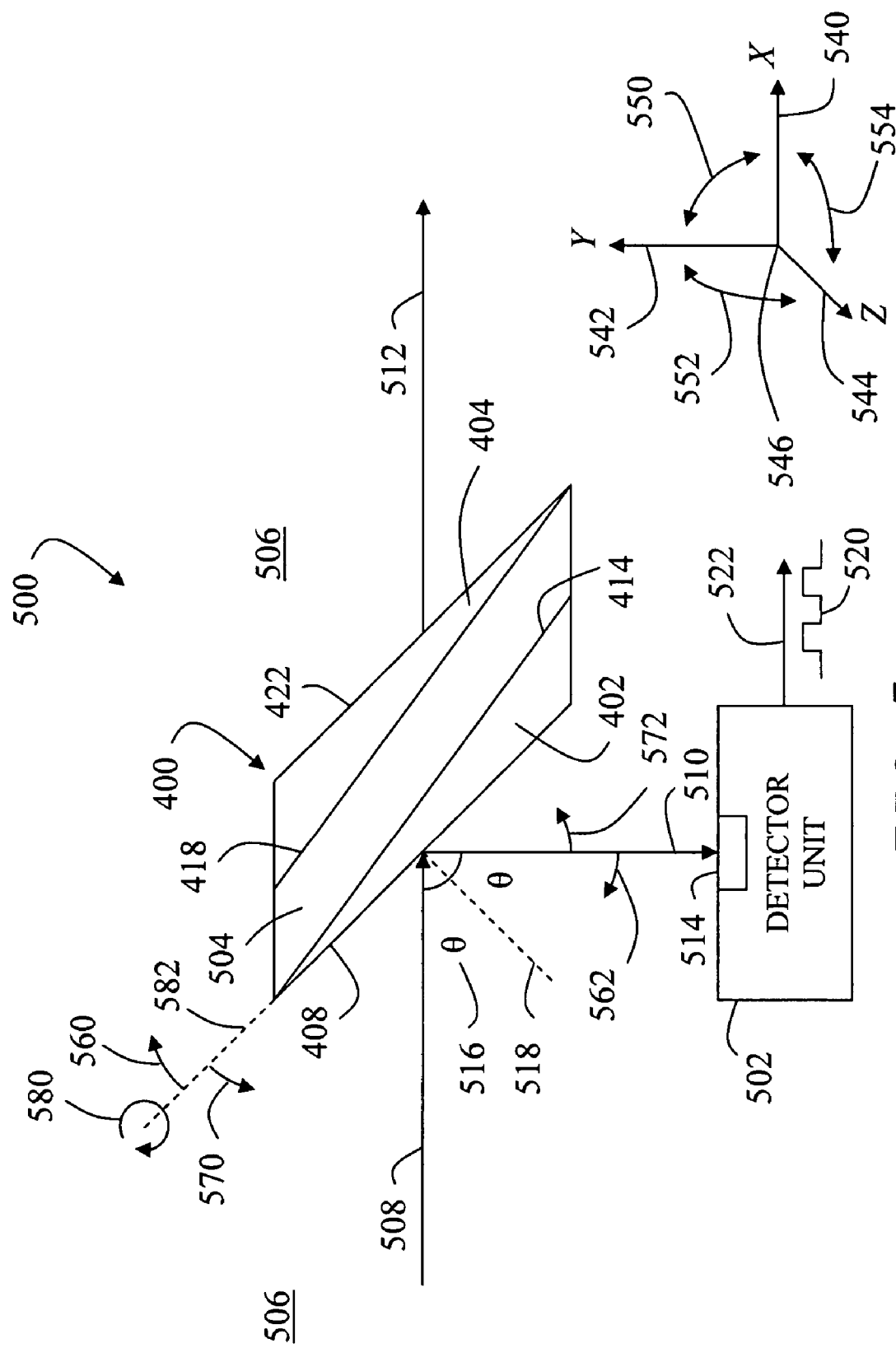
FIG. 5 shows an optical system including a side view of a beam splitter and a detector unit in accordance with an embodiment of the present invention.

FIG. 5 shows an optical system 500 including a side view of beam splitter 400 and a detector unit 502. Beam splitter 400 includes first prism 402 and second prism 404 as previously discussed. An inter-prism region 504 separating first prism 402 and second prism 404 is located between second face 414 of first prism 402 and first face 418 of second prism 404. Inter-prism region 406 must have an index of refraction that is different from the prisms (402, 404) and can be different from the surrounding environment 506. Both inter-prism region 504 and surrounding environment 506 can include a fluid such as air, gas, liquid, or a fluid mixture having a particular index of refraction. Alternatively, inter-prism region 406 can be an enclosure with an evacuated cavity or both the inter-prism region and the surrounding environment may be a vacuum.

In one embodiment shown in FIG. 5, an incident beam 508 traveling along an optical path strikes a portion of first prism 402 first face 408 to produce both a reflected beam 510 that is directed towards detector unit 502 and a refracted beam that is conducted into beam splitter 400. The refracted beam is conducted through first prism 402, through inter-prism region 504, and through second prism 404 to emerge as a transmitted beam 512 from second surface 422 of second prism 404. Assembly 400 can be aligned by tilting in a forward direction 560, tilting in a backward direction 570, and rotating 580 about an axis 582 in order to orient beam splitter 500 so that output beam 512 is not deviated from the optical path of incident beam 508. In this disclosure, the terms tilt and rotate are arbitrary and are used to denote manipulation of beam splitter 400 in three dimensions. Detector 502 can detect or sample incident beam 508 by examining reflected beam 510 in order to measure one or more characteristics of reflected beam 510 such as frequency, wavelength, or intensity. Detector 502 may be, without restriction, any of a number of devices. It may be electronic and produce a corresponding electrical signal (not shown). Alternatively, detector 502 may be a human observer or it may consist of a photographic or photoluminescent plate. If incident beam 508 carries information such as a modulated signal, sampling can be used to extract this information. In another embodiment, beam splitter 400 may be used without detection in order to attenuate incident beam 508, for example.

Incident beam 508 strikes first surface 408 at a non-normal angle of incidence $\theta$ 516 and is reflected at an equal angle of reflectance $\theta$ as measured from a line 518 that is normal to first surface 408. A three-dimensional coordinate system, comprising three, mutually orthogonal axes X-Y-Z, is useful to illustrate properties of beam splitter 400. An X-axis 540, a Y-axis 542, and a Z-axis 544 that emanate from a common origin 546 to define an X-Y plane 550, a Y-Z plane 552, and an X-Z plane 554. Motion within these planes is shown by the direction of the arrows identifying the three planes. The side view shown in FIG. 5 is parallel to the X-Y plane 550 where incident beam 508 and transmitted beam 512 lay along an optical path in an optical path plane that is parallel to the X-Y plane 550 and along a line parallel to the X-axis 540, for ease of illustration.

With the incident beam 508 fixed along an optical path, when beam splitter 400 is rotated about Z-axis 544 within the X-Y plane 550 to a new position, beam splitter 400 can be oriented so that output beam 512 is not deviated from the optical path. The angle of departure for reflected beam 510 is affected when beam splitter 400 is rotated so that detector unit 502 may be moved in order to adequately receive reflected beam 510 with a receiver element 514.

The amount of reflection depends on many factors including the properties of the first prism 402 and the presence of any coating on first surface 408. In this disclosure, output beam 512 is considered free from angular deviation when any actual deviation is measurably insignificant. A beam is considered substantially free from lateral displacement if the portion of the transmitted output beam is sufficiently aligned to operate the optical apparatus within acceptable parameters without realignment of other components. When this is so, beam splitter 400 is considered to be non-deviating. As described in reference to FIG. 4, in an alternative embodiment, the position and direction of the incident and reflecting beams can be swapped.

Figure 6:
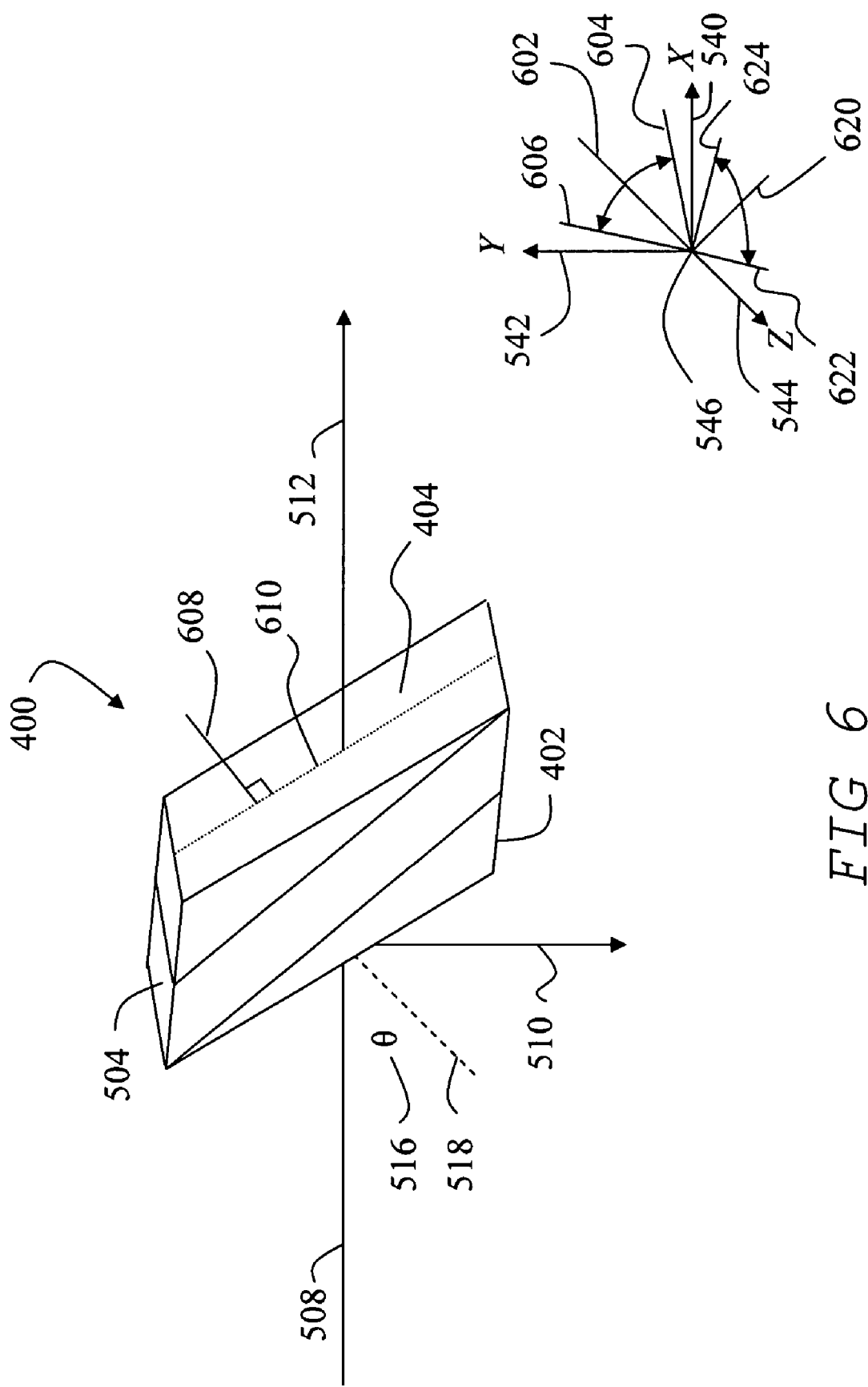
FIG. 6 shows a perspective view of a beam splitter in accordance with an embodiment of the present invention.

FIG. 6 shows a perspective view with beam splitter 400 starting at a beginning X-Y plane angular position where the non-normal angle of incidence $\theta$ 516 for incident beam 508 on the optical path within the optical path plane is approximately 45-degrees in this embodiment as shown on the three-dimensional axes corresponding to an X-Y central angle 602. Since the transmitted output beam 512 is not deviated from the optical path, beam splitter 400 may be removed from obstructing the optical path so that incident beam 508 travels along the original optical path. In this way, beam splitter 400 may be temporarily inserted within an aligned optical system 500 in order to sample incident beam 508 and then be removed from the aligned optical system without requiring recalibration or adjustment to the optical system 500. A normal line 608 is normal to second prism 404 second surface 422 and can be measured from a point where the optical path plane 610 intersects the second prism 404 second surface 422. Other normal lines are present (not shown).

FIG. 7 shows a perspective view of beam splitter 700 including a rigid frame according to an embodiment of the present invention. Beam splitter 700 includes truncated first prism 402 and truncated second prism 404, each having a top surface (702, 704) that is flat and level with a horizontal plane. Correspondingly, each prism (402, 404) has a flat bottom surface (706, 708) that is level with a horizontal plane. Alternatively, top surfaces (702, 704) and bottom surfaces (706, 708) can be non-planar, not level with a horizontal plane, or with each other since light is not expected to operatively pass through these surfaces.

First prism 402 first surface 408 and second surface 414 define planar surfaces that meet at projected apex to form an angle $\alpha_1$ 710. The actual apex is truncated by top surface 702. First surface 408 meets bottom surface 706 at an angle 712. Second surface 414 meets bottom surface 706 at an angle 714. Alternately, during the optical design of prism 700 first prism 402 may be rotated 180-degrees about the Y-axis 542 so that incident beam 508 first strikes second surface 414 as long as the angle $\alpha_1$ 710 is formed between first surface 408 and second surface 414. The angles of the top and bottom surfaces (702, 706) are not relevant since light only passes through first surface 408, and interior portion of first prism 402, and through second surface 414.

Similarly, second prism 404 first surface 418 and second surface 414 define planar surfaces that meet at projected apex to form an angle $\alpha_3$ 716. The actual apex is truncated by bottom surface 708. First surface 418 meets top surface 704 at an angle 718. Second surface 422 meets top surface 704 at an angle 720. Alternately, during the optical design of prism 700 second prism 404 may be rotated 180-degrees about the Y-axis 542 so that incident beam 508 first strikes second surface 422 as long as the angle $\alpha_3$ 716 is formed between first surface 418 and second surface 422. The angles of top and bottom surfaces (704, 708) are not relevant since light only passes through first surface 418, an interior portion of second prism 404, and through second surface 422. The first and second apex angles are located on opposite sides of the optical path. Although angles 712 and 720 are shown as obtuse while angles 714 and 718 are shown as acute, these prism angles are not limited to this configuration.

Beam splitter 700 can be formed as a rigid structure by using an upper frame member 722 and a lower frame member 724 that attach to both first prism 402 and second prism 404. Upper frame member 722 attaches between first prism 402 top surface 702 and second prism 404 top surface 704. Similarly, lower frame member 724 attaches between first prism 402 bottom surface 706 and second prism 404 bottom surface 708. Alternatively, a rigid frame may be formed using one or more clamps for securing and retaining first prism 402 in a fixed, spatial orientation in proximity to and separated from second prism 404. In this manner, first prism 402 and second prism 404 are retained in a fixed, spatial relationship to each other. Alternatively, a frame adjusting mechanism 726, including a threaded screw or other length adjusting device, can be included in either the upper frame member 722 or the lower frame member 724 in order to adjust the relative pitch of the prism surfaces in reference to each other. In this manner, the beam splitter 700 can be tuned to provide the lowest angular and/or lateral deviation for a particular wavelength of incident light, or a compromise tuning for a band of wavelengths. Alternatively, first prism 402 and second prism 404 may be separated by an infinitesimally small distance or touching depending on the parameter limits including the indices of refraction and the prism surface angles as described.

FIG. 8 shows a perspective view of beam splitter 800 with optical elements (402, 404) mounted on a planar member according to an embodiment of the present invention. Beam splitter 800 includes truncated first prism 402 and truncated second prism 404, each having a top surface (802, 804) that is flat and level with a horizontal plane. Correspondingly, each prism (402, 404) has a flat bottom surface (806, 808) that is level with a horizontal plane. First prism 402 first surface 408 and second surface 414 define planar surfaces that meet at projected apex to form an angle $\alpha_1$ 710. The actual apex is truncated by top surface 802. First surface 408 meets bottom surface 806 at an angle 810. Second surface 414 meets bottom surface 806 at an acute angle 812. Similarly, second prism 404 first surface 418 and second surface 414 define planar surfaces that meet at projected apex to form an angle $\alpha_3$ 716. The actual apex is truncated by bottom surface 808. First surface 418 meets top surface 804 at an acute angle 814.

Second surface 422 meets top surface 804 at an angle 816. The angles $\alpha_1$ 710 and $\alpha_3$ 716 are relevant because they describe the angular relationship between the first and second surfaces of the prisms (402, 404). The relative position of the first prism 402 to the second prism 404 relative to the incident beam 508 determine the angular relationships of first surface 408, second surface 414, third surface 418, and fourth surface 422 to an optical path through beam splitter 800. Beam splitter 800 can be formed as a rigid structure by mounting both first prism 402 and second prism 404 to a rigid planar member 818 using an adhesive or mechanical retaining device. In this manner, first prism 402 and second prism 404 are retained in a fixed relationship to each other. In this embodiment, the relative position of the first prism 402 and the second prism 404 cannot be adjusted if the optical elements (402, 404) are permanently mounted to planar member 818. Although first surface 408 and second surface 422 are shown relatively parallel with the edges of planar member 818, this orientation does not imply that an input beam may be applied at normal incidence to first surface 408.

FIG. 9 shows a side view illustrating both internal and external angles relevant to the operation of beam splitter 900 in accordance with an embodiment of the present invention. Incident light beam 428 on an optical path strikes first surface 408 of first prism 402 at an angle $\theta_1$ 902 measured from local surface normal 904 at first surface 408 in order to produce first reflected beam 430 at a reflected angle $\theta_1$ 902 and first refracted beam 432 at an angle $\theta_2$ 906 measured from local surface normal line 904. If the index of refraction of the medium containing beam 428 is $n_1$ and the index of the first element is $n_2$, then the first surface refraction may be expressed as:

$\theta_1 = \text{Arc Sin}\,[(n_2/n_1)*\text{Sin}\,[\theta_2]]$  Equation-5

First refracted beam 432 follows a trajectory within first prism 402 to strike an interior portion of first prism 402 second surface 414 at an angle $\theta_3$ 908 measured from a surface normal 910 to second surface 414 and emerges as first transmitted beam 434 from first prism 402 second surface 414 at an angle $\theta_4$ 912 measured from normal line 910.

Following the beam through the assembly and using the same method as above yields the following equations:

$\theta_3 = \text{Arc Sin}\,[(n_3/n_2)*\text{Sin}(\theta_4)]$  Equation-6

$\theta_5 = \text{Arc Sin}\,[(n_4/n_3)*\text{Sin}(\theta_6)]$  Equation-7

$\theta_7 = \text{Arc Sin}\,[(n_5/n_4)*\text{Sin}(\theta_8)]$  Equation-8 where all angles are measured relative to a local surface normal. In this disclosure, the symbol "*" is used to denote multiplication, not convolution, and may be used to clarify adjacent terms are multiplied.

First prism 402 first surface 408 and second surface 414 define planar surfaces that meet at an actual or projected apex to form an angle $\alpha_1$ 914. Second prism 404 first surface 418 and second surface 422 define planar surfaces that meet at an actual or projected apex to form an angle $\alpha_3$ 928. Similarly, first prism 402 second surface 414 and second prism 404 first surface 418 define planar surfaces that meet at an actual or projected apex to form an angle $\alpha_2$ 930.

Use of the laws of trigonometry and geometry yields the following useful relationships:

$\theta_3 = \theta_2 + \alpha_1$  Equation-9

$\theta_5 = \theta_4 + \alpha_2$  Equation-10

$\theta_7 = \theta_6 + \alpha_3$  Equation-11

In order to not deviate the output beam, it is required that the sum of all the beam steering angles be equal to zero:

Deviation $= [(\theta_1-\theta_2)+(\theta_3-\theta_4)+(\theta_5-\theta_6)+(\theta_7-\theta_8)] = 0$  Equation-12

Solving for the output angle in terms of the input angle, the prism angles, and the angle of the inter-prism area (if any) yields the result:

$$D := \theta_1 + \alpha_1 + \alpha_2 + \alpha_3 - a\sin\left(n_4 \cdot \frac{\sin\left(a\sin\left(n_3 \cdot \frac{\sin\left(a\sin\left(n_2 \cdot \frac{\sin\left(a\sin\left(n_1 \cdot \frac{\sin(\theta_1)}{n_2}\right)+\alpha_1\right)}{n_3}\right)+\alpha_2\right)}{n_4}\right)+\alpha_3\right)}{n_5}\right)$$  Equation-13 which is the necessary condition to achieve zero angular deviation.

When first prism 402 second surface 414 and second prism 404 first surface 418 define parallel planar surfaces, angle $\alpha_2$ 930 is equal to zero. Incident beam 428 and second transmitted beam 438 travel along an optical path 932 defined by the incident path of incident beam 428. First prism 402 second face 414 is separated from second prism 404 first face 418 by a separation distance 934 along optical path 932. If the index of the second prism is the same as that of the first prism ($n_2=n_4$), and the index after the second prism is the same as that prior to the first prism and the index of inter-prism medium ($n_5=n_3=n_1$) then Equation-13 reduces to:

$$D := \theta_1 + \alpha_1 + \alpha_2 + \alpha_3 - a\sin\left(n_4 \cdot \sin\left(a\sin\left(\frac{\sin\left(a\sin\left(n_2 \cdot \sin\left(a\sin\left(\frac{\sin(\theta_1)}{n_2}\right) + \alpha_1\right)\right) + \alpha_2\right)}{n_4}\right) + \alpha_3\right)\right)$$

Equation-14

The vertical distance between optical path 932 and where first transmitted beam 434 emerges from second surface 414 corresponds to an offset $d_1$ 938. In this example, offset $d_1$ 938 is a positive value. The vertical distance between optical path 932 and where the first transmitted beam 434 strikes first surface 418 corresponds to an offset $d_2$ 940. In this example, offset $d_2$ 940 is a negative value. Finally, the distance between optical path 932 and where output beam 438 emerges from second surface 422 corresponds to an offset $d_3$ 942. If non-deviating beam splitter 900 is optimally oriented, offset $d_3$ 942 will be very close to zero corresponding to essentially no lateral deviation. In yet another alternative, separation distance 934 may be zero so that second surface 416 has direct physical contact with first surface 418. In this manner, the prisms may be optically contacted to one another. Alternatively, second surface 416 and first surface 418 may be held together using an optical adhesive material. Looking briefly at FIG. 14, for a generic model, the values of $d_1$, $d_2$, and $d_3$ are shown.

Figure 10:
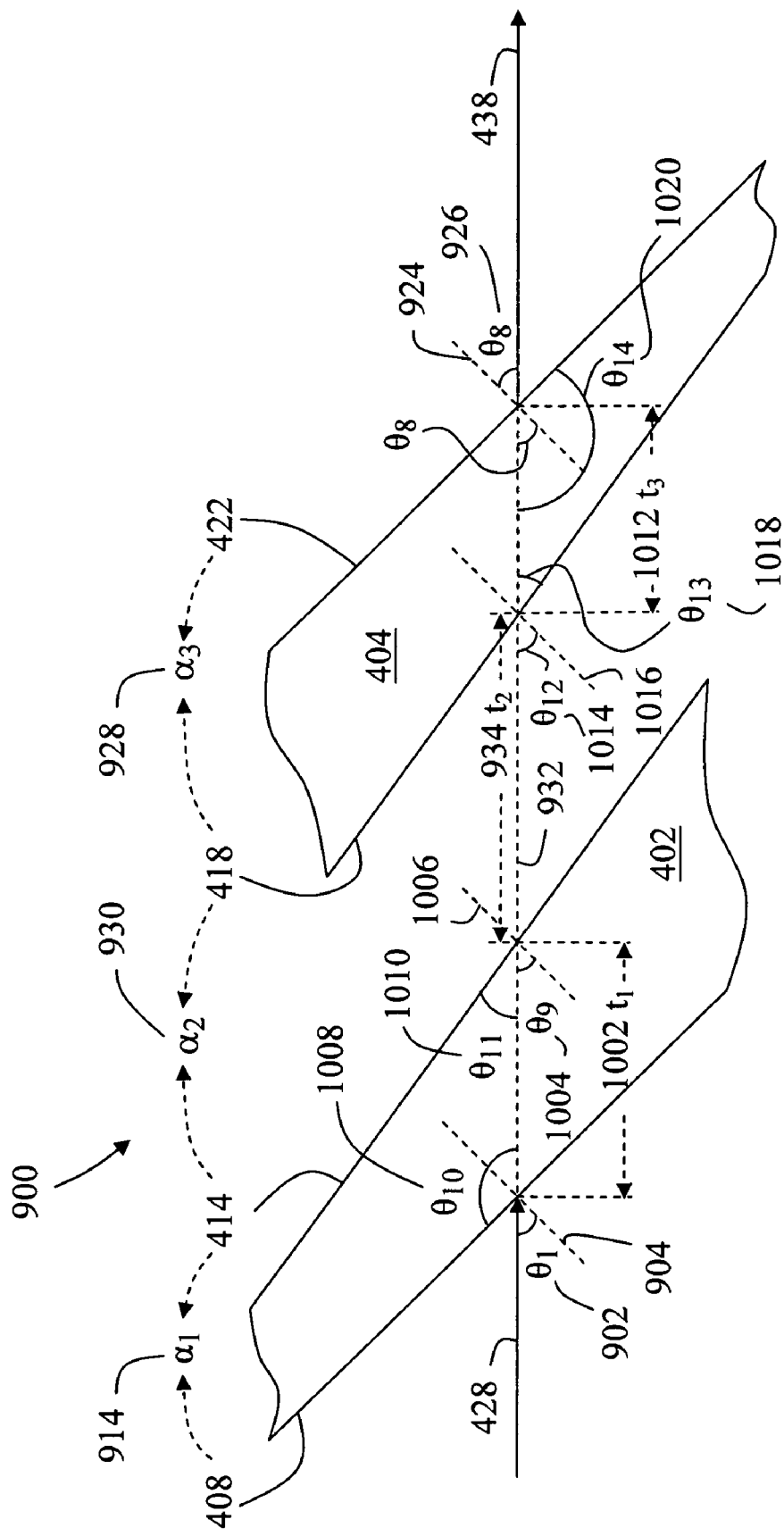
FIG. 10 shows angular relationships of the incident and transmitting surfaces compared to the optical path of an incident beam in accordance with an embodiment of the present invention.

FIG. 10 shows the angular relationships of the incident and transmitting surfaces (408, 414, 418, 422) as compared with the initial path 932 of an incident beam 428. Line 932 is the continuation of the line defined by input beam 428 and shown as a dotted line. Incident light beam 428 on path 932 strikes first surface 408 of first prism 402 at an angle $\theta_1$ 902 measured from a line 904 normal to first surface 408. In this manner, the orientation of first prism 402 first surface 408 relative to incident beam 428 can be determined from the angle normal line 904 makes with line 932. Similarly, line 932 intersects first prism 402 second surface 414 at an angle $\partial 4_9$ 1004 measured from a line 1006 normal to second surface 414. A triangular region is defined by the three angles $\alpha_1$ 914, $\theta_{10}$ 1008, and $\theta_{11}$ 1010. Using the relationships of simple geometry it is readily shown that, with all angles measured in degrees:

$\theta_{10}=90+\theta_1$  Equation-15

$\theta_{11}=90-\theta_9$, and  Equation-16

$\alpha_1=180-\theta_{10}-\theta_{11}$  Equation-17

Similar use of geometry may be used in the second prism to show:

$\theta_{13}=90-\theta_{12}$  Equation-18

$\theta_{14}=90+\theta_8$, and  Equation-19

$\alpha_3=180-\theta_{13}-\theta_{14}$  Equation-20

Line 932, the extension of the input optical path encounters first surface 418 of second prism 404 at an angle $\theta_{12}$ 1014 measured from a line 1016 normal to second prism 404 first surface 418. In this manner, the orientation of second prism 404 first surface 418 relative to incident beam 428 can be determined from the angle normal line 1016 makes with line 932. Similarly, optical path 932 intersects second prism 404 second surface 422 at an angle $\theta_8$ 926 measured from line 924 normal to second surface 422.

Figure 14:
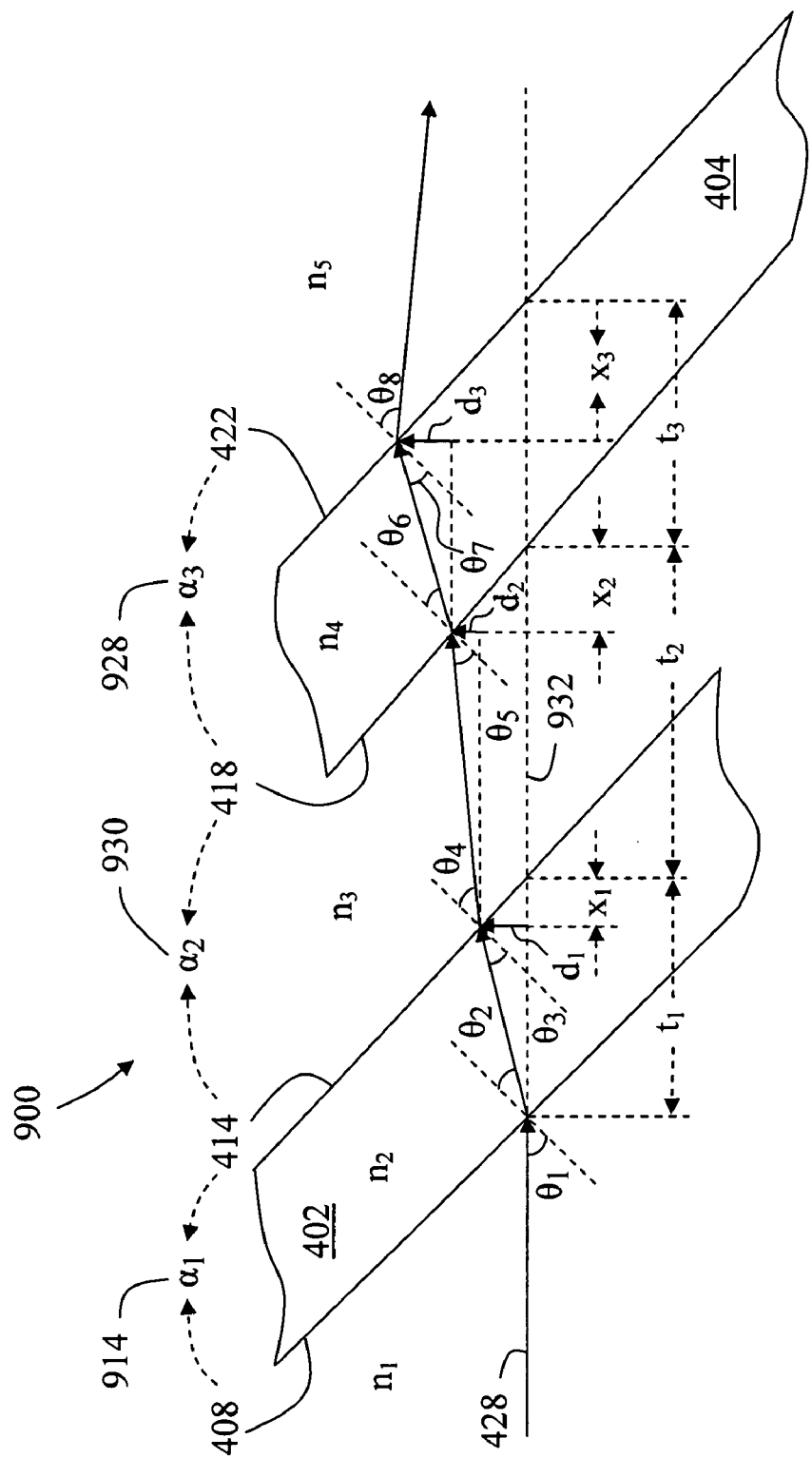
FIG. 14 shows a side view illustrating both internal and external angles relevant to the operation of a generic beam splitter.

Looking at FIG. 10 and briefly at FIG. 14, first prism thickness, $t_1$, 1002 is measured along line 932. The separation of the two prisms, $t_2$, 934 is measured along the same line 932. Second prism thickness, $t_3$, 1012 is measured along line 932. The beam offset can be computed at each surface as the beam traverses the optical system. If $d_1$ is the offset at surface 414, $d_2$ the offset at surface 418, and $d_3$ the offset at surface 422, the following relationships hold:

$\theta_1=\text{Arc Tan}[d_1/(t_1-x_1)]-\alpha_1+\theta_3$  Equation-21

$\theta_1=\text{Arc Tan}[x_1/d_1]-\alpha_1$  Equation-22

$\theta_1=\text{Arc Tan}[d_2/(x_1+t_2-x_2)]-\alpha_1-\alpha_2+\theta_5$  Equation23

$\theta_1=\text{Arc Tan}[x_2/(d_1+d_2)]-\alpha_1-\alpha_2$  Equation-24

Using the above equations and solving for d1 and d2 yields:

$d_1=\text{Cos}[\alpha_1+\theta_1]\text{Sec}[\theta_3]\text{Sin}[\alpha_1+\theta_1-\theta_3]t_1$  Equation-25

$d_2=-\text{Sec}[\theta_3]\text{Sec}[\theta_5]\text{Sin}[\alpha_1+\alpha_2+\theta_1-\theta_5]*(\text{Sin}[\alpha_2]\text{Sin}[\alpha_1+\theta_1-\theta_3]/t_1-\text{Cos}[\alpha_1+\alpha_2+\theta_1]\text{Cos}[\theta_3]t_2)$  Equation-26

Adding in the additional relationships for the second prism:

$\theta_1=\text{Arc Tan}[d_3/(x_2+t_3-x_3)]-\alpha_1-\alpha_2-\alpha_3+\theta_7$  Equation-27

$\theta_1=\text{Arc Tan}[x_3/(d_1+d_2+d_3)]-\alpha_1-\alpha_2-\alpha_3$  Equation-28 yields an expression for $d_3$ in terms of $d_1$, $d_2$ and $t_3$:

$d_3=(1/2)\text{Sec}[\text{Arc Sin}[(\text{Sin}[\theta_2]/n_2)/n_1]+\alpha_1+\alpha_2]\text{Sec}[\alpha_3+\theta_6]*\text{Sin}[\text{Arc Sin}[(\text{Sin}[\theta_2]/n_2)/n_1]+\alpha_1+\alpha_2-\theta_6]*(-2\text{Sin}[\alpha_3/d_1-2\text{Sin}[\alpha_3/d_2+(\text{Cos}[\alpha_3]+\text{Cos}[2\text{Arc Sin}[(\text{Sin}[\theta_2]/n_2)/n_1]+2\alpha_1+2\alpha_2+\alpha_3])t_3)$  Equation-29

Note that it is also possible to obtain $d_3$ in terms of $t_1$, $t_2$ and $t_3$. In order for the lateral deviation D to equal zero, the sum of $d_1$, $d_2$, and $d_3$ must equal zero:

$D=d_1+d_2+d_3=0$  Equation-30

Referring to FIG. 10 for the nomenclature, in one example, $\theta_1$ is equal to 45.00-degrees, $\theta_9$ is equal to 54.79-degrees, $\theta_{12}$ is equal to 54.79-degrees, and $\theta_8$ is equal to 44.49-degrees. Although not generally true, since $\theta_9$ and $\theta_{12}$ are equal, first prism 402 second surface 414 and second prism 404 first surface 418 are parallel planar surfaces. Since the intersection angles with optical path 932 are known, $\theta_{10}$ is equal to 135.00-degrees, $\theta_{11}$ is equal to 35.21-degrees, $\theta_{13}$ is equal to 35.21-degrees, and $\theta_{14}$ is equal to 134.49- degrees,. Knowing these values for $\theta_{10}$ 1008 and $\theta_{11}$ 1010 yields $\alpha_1$ is equal to 9.79-degrees and $\alpha_3$ is equal to 10.30-degrees. With this construction, beam splitter 900 may be rotated about the Z-axis 544, in a plane parallel to the X-Y plane 550, where second transmitted beam 438 does not deviate from the optical path angularly and only minimally deviates laterally for small rotations of the beamsplitter. The compact profile of beam splitter 900 permits use without disturbing the existing alignment of the larger optical system. Similarly, beam splitter 900 may subsequently be removed from a larger optical system without disturbing the alignment of the optical system. In an alternative embodiment, first prism thickness, $t_1$ 1002 is equal to second prism thickness, $t_3$, 1012 as measured along line 932.

FIG. 11 shows a portion of an optical system 1100 including a first optical element 1102 and a second optical element 1104 which can be lenses or other optical components between which an optical path may be defined. First optical element 1102 is fixed in a first position and receives an incident light beam 1106. First optical element 1102 emits or produces a first transmitted beam 1108 that exists along an optical path. Second optical element 1104 is fixed in a second position and receives first transmitted beam 1108. Second optical element 1104 produces a second transmitted beam 1110. Transmitted beam 1108 exists on an optical path between optical element 1102 and optical element 1104 based on the alignment between the optical elements.

FIG. 12 shows a beam splitter 400 inserted into the optical path (also referred to as an optical train) between the optical elements (1102, 1104) to form an optical system 1200. First optical element 1102 produces a first transmitted beam 1108 that is equivalent to incident beam 508 that strikes first prism 402 first surface 408 to produce reflected beam 510. Beam splitter 400 can be adjusted by tilting and rotating to direct transmitted output beam 512 along the optical path of incident beam 1108, while reflected beam 510 is directed towards an adjusting mirror 1202 that receives reflected beam 510 and produces adjusted beam 1204 that is directed toward receiving element 514 of detector unit 502. Detector unit 502 receives adjusted beam 1204 and produces a signal 1206 on detector output 522 representing at least one characteristic of reflected beam 510 such as intensity, frequency, change in value, or a modulation of adjusted beam 1204. In this manner, optical system 1200 intercepts incident beam 1108 and can continue to operate within acceptable tolerances after beam splitter 400 is inserted and manipulated as discussed. Optical system 1200 is aligned in the sense that transmitted beam 1108 exists on a predetermined optical path (also referred to as an incident beam line of sight).

Figure 13:
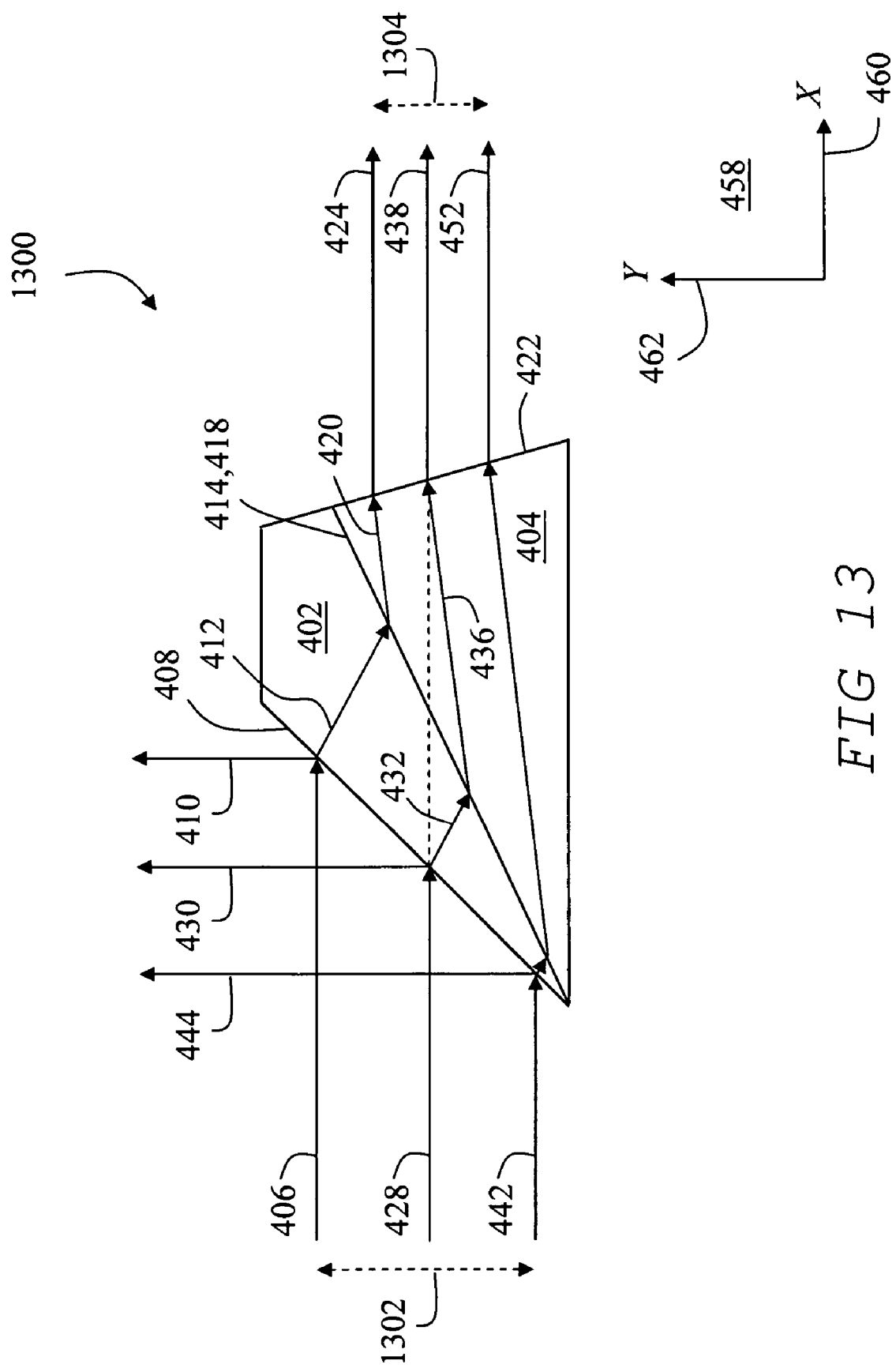
FIG. 13 shows a side view of a compact, solid non-deviating beam splitter in accordance with another embodiment of the present invention.

FIG. 13 shows a side view of a compact, solid non-deviating beam splitter 1300 in accordance with another embodiment of the present invention. Note that in this case the beam size in one plane is changed. Only the central ray and the centroid of the bundle are laterally undeviated. Moving the beam splitter assembly 1300 in the plus or minus y-direction will allow the user to laterally shift the centroid of the beam while preserving the angular pointing of the beam. Beam splitter 1300 includes a first prism 402 and a second prism 404 where a transmitting surface 414 of first prism 402 is physically adjacent to a receiving surface 418 of second prism 404 without an inter-prism region. An incident light beam 428 on an optical path strikes a first portion of a receiving surface 408 such as a first surface 408 of first prism 402 to produce a first reflected beam 430 and a first refracted beam 432. Incident beam 428 and reflected beam 430 lie within and define an incident plane. First refracted beam 432 follows a trajectory within first prism 402 and emerges from transmitting surface 414 of first prism 402 as a first transmitted beam that immediately strikes first surface 418 of second prism 404 to produce a second reflected beam (not shown) and a second refracted beam 436. Second refracted beam 436 emerges from a transmitting surface 422 of second prism 404 as a second transmitted beam 438 or output beam. The receiving and transmitting surfaces (408, 414, 418, and 422) can include anti-reflection coatings. Alternatively, any of the receiving and transmitting surfaces (408, 414, 418, and 422) can include partially-reflective coating so that a fraction of the input beam is reflected and a fraction is transmitted so that the apparatus may be used as a beam splitter.

FIG. 13 illustrates that each incident beam (406, 428, 442) strikes a different portion of receiving surface 408 at a non-normal angle to produce a different reflected beam (410, 430, 444) and emerges to produce a different transmitted beam (424, 438, 452) where each transmitted beam (424, 438, 452) is parallel to the optical path of the corresponding original incident beam (406, 428, 442). Consider x-axis 460 and y-axis 462 in FIG. 13. In this embodiment, the output beams are compressed in the y-axis 462 direction due to anamorphic effects where unequal magnification occurs in reference to perpendicular axes. For example, the incident beams (406, 428, and 442) have a first separation distance 1302 while the transmitted beams (424, 438, and 452) have a second separation distance 1304 that is different from first separation distance 1302. In this case, second separation distance 1304 is smaller than first separation distance 1302. In contrast to the discussion of FIG. 4, the slopes of surfaces 408, 414, 418, and 422 shown in FIG. 13 are not all of the same sign. Instead, the slopes of all but one of the relevant prism surfaces (408, 414, and 418) have the same sign, while the remaining surface 422 has a slope of the opposite sign.

VERIFICATION

The non-deviating behavior of the beam splitter according to an embodiment of the present invention was validated using an optical system design and analysis tool CODE V (R) from Optical Research Associates, Pasadena, Calif. 91107. In one embodiment designed for use at both 1315-nanometer and 1050-nanometer wavelength light and using low dispersion glass, an incident beam of 1315-nanometer wavelength light was incident upon a beam splitter 402 along an X-axis 540 and exited at a height in the Y-axis 542 direction of 0.00083-inches (0.83-mils) above the X-axis 540 and at an angle of 0.00000-microradians For this embodiment, an incident beam of 1050-nanometer wavelength light was incident upon a beam splitter 402 along an X-axis 540 and exited at a height of –0.00081-inches (–0.81-mils) on the Y-axis 542 below the X-axis 540, and at an angle of 0.00000-microradians. In this embodiment, a visible 'alignment' beam at 632.8 nanometers exits the assembly 0.00481 inches below the Y-axis.

In another embodiment designed for use at both 1315-namometer and 1050-nanometer wavelength light, an incident beam of 1315-nanometer wavelength light was incident upon a beam splitter 400 of high dispersion glass along an X-axis 540 and exited at a height in the Y-axis direction of 0.00151-inches (1.5-mils) above the X-axis 540 and at an angle of 0.000000-microradians. For this embodiment, an incident beam of 1050-nanometer wavelength light was incident upon a beam splitter 400 along an X-axis 540 and exited at a height in the Y-axis 542 direction of 0.00149-inches (1.49-mils) below the X-axis 540 and at an angle of 0.00000-microradians, and an 'alignment' beam at 632.8-nanometers exited at 0.01394-inches above the axis and with an exit beam angle of 0.0000-microradians. In both of the described embodiments, the visible beam is used to get the optics approximately aligned before going to the near-infrared (NIR) beams which require special viewing devices.

Embodiments described above illustrate but do not limit the invention. It should also be understood that numerous modifications and variations are possible in accordance with the principles of the present invention. Accordingly, the scope of the invention is defined only by the following claims.

We claim:

1. An optical system, comprising: two tilted planar elements each having two surfaces for which the sign of the slopes of at least three of the four surfaces that an incident beam encounters are the same and which, when inserted into the path of the incident beam produces an output beam having no angular deviation and essentially no lateral deviation from the incident beam path.

2. The system of claim 1, wherein the two tilted planar elements are optical elements that are physically separated from each other, and wherein all four surfaces have slopes of the same sign.

3. The system of claim 2, wherein the optical elements are prisms that are surrounded by a material other than the material used to construct either prism.

4. The system of claim 3, wherein a medium in a region before the first element and following the second element may be different from that between the elements.

5. The system of claim 4, wherein the medium in the region before the first element may be different from that following the second element.

6. The system of claim 3, wherein the elements are separated by a vacuum in an inter-prism space and the medium before the first prism and after the second prism is not a vacuum.

7. The system of claim 3, wherein the optical elements are surrounded by air.

8. The system of claim 3, wherein the optical elements are surrounded by vacuum.

9. The system of claim 3, wherein the prisms are composed of the same materials.

10. The system of claim 3, wherein the prisms are composed of different materials.

11. The system of claim 9, wherein the prisms are composed of fused silica.

12. The system of claim 9, wherein the two prisms are substantially identical being composed of the same material and having the same apex angles.

13. The system of claim 12, wherein the two prisms are disposed so that a first surface of the first prism is parallel to a second surface of the second prism, and a second surface of the first prism is parallel to a first surface of the second prism.

14. The system of claim 13, wherein the prisms are disposed so that a thickness of each prism measured along a line representing the center of the incident beam is the same for both prisms.

15. The system of claim 9, wherein the apex angles of the two prisms are different from one another.

16. The system of claim 10, wherein the apex angles of the two prisms are different from one another.

17. The system of claim 14, wherein an incidence angle of the incident beam at the first prism is 45 degrees, the apex angles of the two prisms are 11.334 degrees, the two thicknesses are 0.75 inches, the interprism separation distance is 0.75 inches, the material composition of each prism is fused silica and the usage wavelengths are one of 1315 nm and 1050 nm, wherein the angular deviation for both wavelengths is zero degrees and the lateral deviation is less than 0.0018 inches for both wavelengths.

18. The system of claim 2, wherein the two optical elements are prisms that are supported by a common mounting structure.

19. The system of claim 2, wherein a surface of one of the prisms is coated with a partially reflective material so that a fraction of the input beam is reflected and a fraction is transmitted so that the resulting apparatus may be used as a beam splitter.

20. The system of claim 2, wherein at least one prism surface is partially absorbing so that the resulting apparatus may be used as an attenuator.

21. The system of claim 2, wherein at least one of the prisms is made of a partially absorbing material so that the resulting apparatus may be used as an attenuator.

22. The system of claim 19, wherein at least one of the surfaces is partially absorbing so that the resulting apparatus may be used as an attenuating beam splitter.

23. The system of claim 19, wherein at least one of the prisms is constructed of a partially absorbing material so that the resulting apparatus may be used as an attenuating beam splitter.

24. The system of claim 1, wherein a second surface of the first element is in physical contact with a first surface of the second element.

25. The system of claim 24, wherein the two tilted planar elements are prisms that have been optically contacted to one another.

26. The apparatus of claim 24, wherein the two prisms are held together with an adhesive.

27. The system of claim 24, wherein the incidence angle at the first prism is 40 degrees, the material composition of the first prism is LaF21, the material composition of the second prism is FK54, the physical thickness of the first prism measured along an extension of the incident beam is 0.81253 inches, the physical thickness of the second prism measured along an extension of the extension of the first prisms incident beam residing wholly within the second prism is 0.44691 inches, the apex angle of the first prism is 31.4176 degrees, and the apex angle of the second prism is 100.0434 degrees.

28. A method of inserting the system of claim 1 into an optical train without causing a deviation of the incident line of sight.

29. The method of claim 28, wherein a fraction of the intercepted beam is reflected.

30. The method of claim 29, wherein the reflected beam is applied to a detector in order to measure at least one characteristic of the intercepted beam.

31. The method of claim 28, wherein a fraction of the beam is absorbed.

32. The method of claim 29, wherein a second line of sight is reflected to become coincident with the line of sign of the existing optical train.

* * * * *